United States Patent [19]

Miyagawa et al.

[11] Patent Number: 4,736,443
[45] Date of Patent: * Apr. 5, 1988

[54] PATTERN DISCRIMINATOR

[75] Inventors: Michiaki Miyagawa, Hachiooji; Kouichi Ohki, Tokyo; Matsuhiko Takaya, Hino; Naoto Fujihara, Hino; Tadayuki Yamada, Hino, all of Japan

[73] Assignee: Fuji Electric Co., Ltd., Japan

[*] Notice: The portion of the term of this patent subsequent to Oct. 1, 2002 has been disclaimed.

[21] Appl. No.: 16,441

[22] Filed: Feb. 23, 1987

Related U.S. Application Data

[60] Continuation of Ser. No. 775,800, Sep. 13, 1985, abandoned, which is a division of Ser. No. 483,504, Apr. 11, 1983, Pat. No. 4,545,070.

[30] Foreign Application Priority Data

Apr. 30, 1982 [JP] Japan .................................. 57-71496
Apr. 30, 1982 [JP] Japan .................................. 57-71497

[51] Int. Cl.⁴ .......................................... G06K 9/20
[52] U.S. Cl. ........................................ 382/48; 382/61
[58] Field of Search ................. 382/41, 50, 48, 61; 358/282, 106; 340/723

[56] References Cited

U.S. PATENT DOCUMENTS

| | | | |
|---|---|---|---|
| 3,104,372 | 9/1963 | Rabinow et al. | 382/50 |
| 3,872,434 | 3/1975 | Duvall et al. | 382/50 |
| 4,021,777 | 5/1977 | Shepard | 382/61 |
| 4,230,265 | 10/1980 | Casaly | 382/50 |
| 4,251,837 | 2/1981 | Janeway, III | 382/50 |
| 4,378,494 | 3/1983 | Miller | 358/106 |
| 4,384,272 | 5/1983 | Tanaka et al. | 382/50 |
| 4,434,503 | 2/1984 | Tanaka et al. | 382/48 |
| 4,517,606 | 5/1985 | Yokomizo et al. | 382/50 |
| 4,545,070 | 10/1985 | Miyagaw et al. | 382/48 |
| 4,554,594 | 11/1985 | Ciardiello et al. | 358/282 |
| 4,570,181 | 2/1986 | Yamamura | 382/48 |
| 4,584,703 | 4/1986 | Hallberg | 382/50 |

Primary Examiner—Leo H. Boudreau
Assistant Examiner—Joseph Mancuso
Attorney, Agent, or Firm—Brumbaugh, Graves, Donohue & Raymond

[57] ABSTRACT

A pattern discriminator receives scanning data obtained by raster scanning objects within predefined window regions with a photoelectric converter, converts the scanned data into pixel binary data by using a threshold value dependent upon the scanning position and window region and evaluates the binary data in accordance with predetermined criteria to produce an output signal indicative of the evaluation. A memory stores data which represents the window regions in a compressed arrangement indicating the ordinate and abscissa coordinates of the beginning and ending points or pixels of each window region location on each scanning line, along with corresponding information representing the particular threshold value to be used for each window region segment on each scanning line.

1 Claim, 5 Drawing Sheets

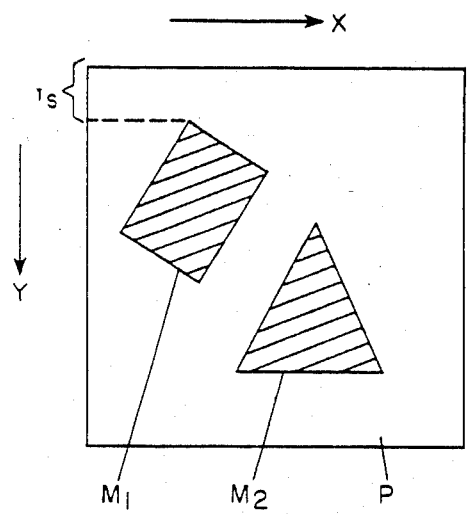
FIG. 1
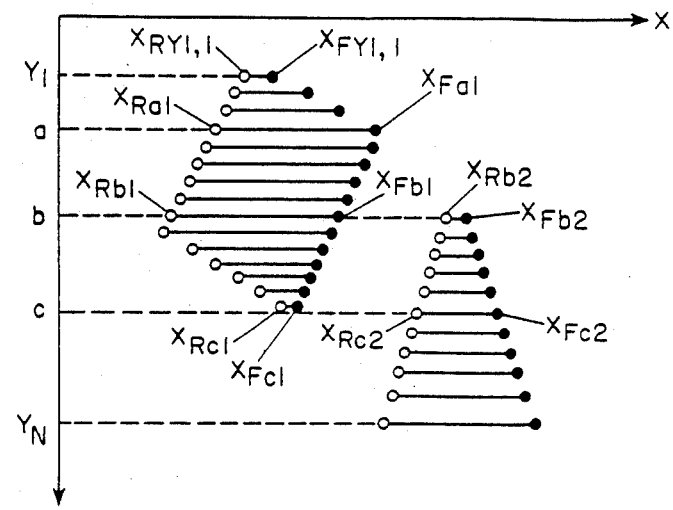
FIG. 2
| ORDINATE | ABSCISSA 1st LEADING POINT | ABSCISSA 1st TRAILING POINT | ABSCISSA 2nd LEADING POINT | ABSCISSA 2nd TRAILING POINT |
|---|---|---|---|---|
| 1 | * | * | * | * |
| 2 ⋮ | • ⋮ * | • ⋮ * | • ⋮ * | • ⋮ * |
| Y1 | $X_{RY1,1}$ | $X_{FY1,1}$ | * | * |
| Y2 | $X_{RY2,1}$ | $X_{FY2,1}$ | * | * |
| ⋮ | ⋮ | ⋮ | ⋮ | ⋮ |
| a | $X_{Ra1}$ | $X_{Fa1}$ | $X_{Ra2}$ | $X_{Fa2}$ |
| ⋮ | ⋮ | ⋮ | ⋮ | ⋮ |
| b | $X_{Rb1}$ | $X_{Fb1}$ | $X_{Rb2}$ | $X_{Rb2}$ |
| ⋮ | ⋮ | ⋮ | ⋮ | ⋮ |
| c | $X_{Rc1}$ | $X_{Rc1}$ | $X_{Rc2}$ | $X_{Rc2}$ |
| c+1 ⋮ | • ⋮ | • ⋮ | • ⋮ | • ⋮ |
| $Y_N$ ⋮ | $X_{RYN,1}$ ⋮ * | $X_{FYN,1}$ ⋮ * | • ⋮ * | • ⋮ * |
| 256 | $X_{R256,1}$ | $X_{F256,1}$ | $X_{R256,2}$ | $X_{F256,2}$ |
FIG. 3

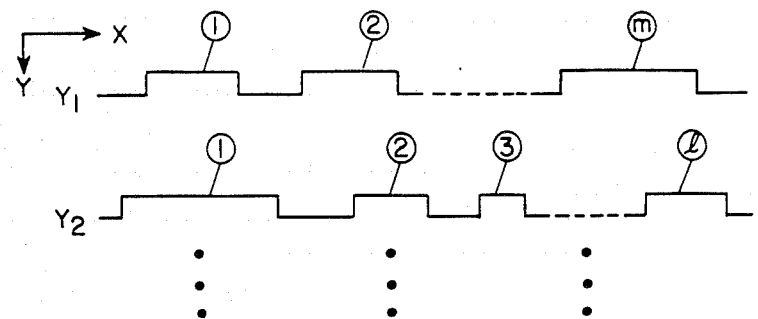
FIG. 6
| ABSCISSA LEADING POINT | ABSCISSA TRAILING POINT |
|---|---|
| $X_{RY1,1}$ | $X_{FY1,1}$ |
| $X_{RY1,2}$ | $X_{FY1,2}$ |
| ⋮ | ⋮ |
| $X_{RY1,m}$ | $X_{FY1,m}$ |
| FF | FF |
| $X_{RY2,1}$ | $X_{FY2,1}$ |
| $X_{RY2,2}$ | $X_{FY2,2}$ |
| ⋮ | ⋮ |
| $X_{RY2,}$ | $X_{FY2,}$ |
| FF | FF |
| ⋮ | ⋮ |
FIG. 5
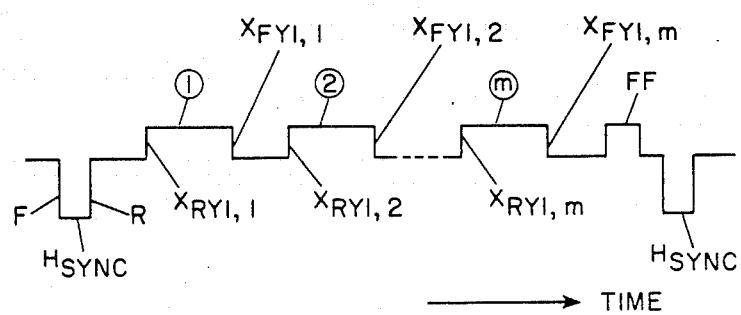
FIG. 8
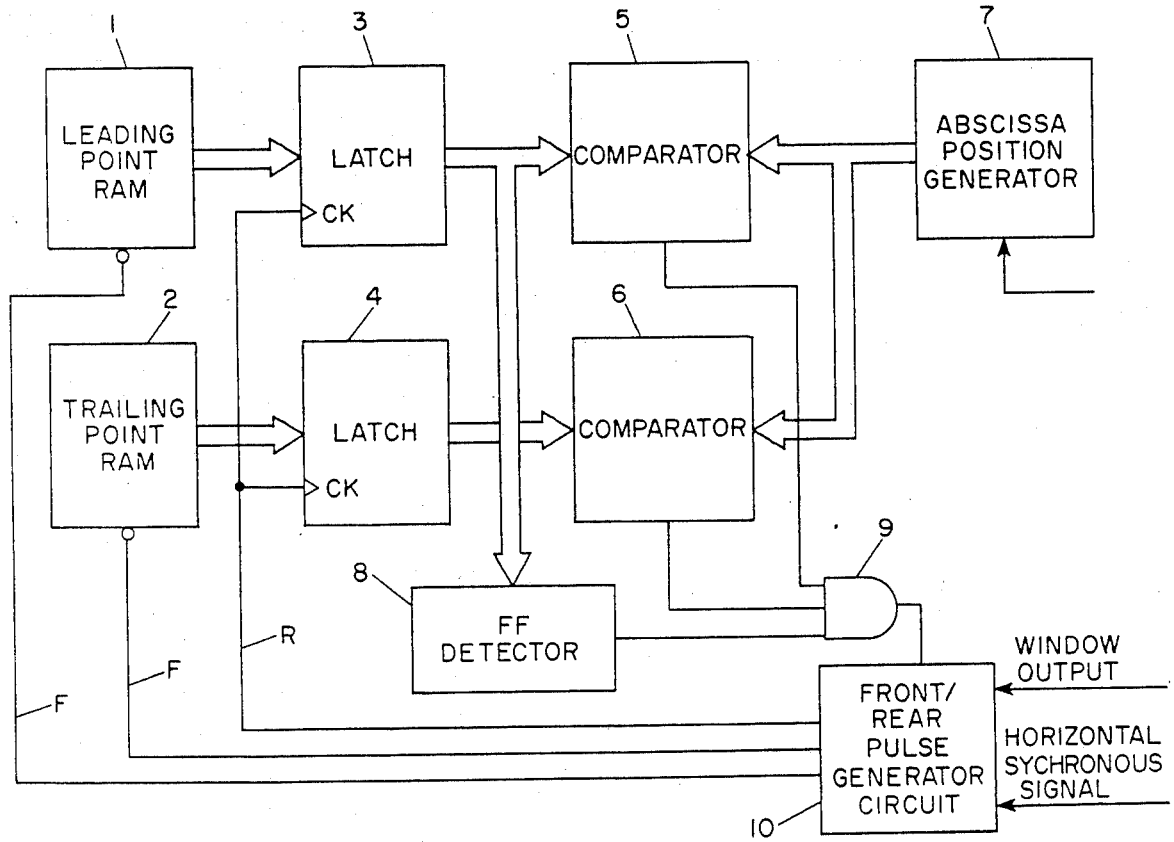
FIG. 7

PATTERN DISCRIMINATOR

This is a continuation of application Ser. No. 775,800, filed on Sept. 13, 1985, now abandoned, which is a division of application Ser. No. 483,504 filed Apr. 11, 1983 now U.S. Pat. No. 4,545,070.

BACKGROUND OF THE INVENTION

This invention relates to improvements in a pattern discriminator, and more particularly to improvements in either a multi-window type pattern discriminator, or an expanded version of a type of discriminator referred to as a template matching pattern discriminator previously proposed by one of the present inventors (see Japanese Patent Application No. 016433, 1982).

In a multi-window type pattern discriminator previously proposed, the characteristics of sectional patterns in a plurality of window regions are set up within a field of vision of a television camera. The characteristics are then quantitatively extracted from binary coded outputs obtained by processing the time based electrical signals using preset threshold levels. The time based electrical signals are obtained by picking up images of patterns being examined with a photoelectric converter of the two-dimension sequential scanning type (for example, an industrial television camera). Subsequently, a range of upper and lower threshold limits is set up on a window region basis, and the magnitude of a characteristic extracted from the scan bears logic 1 if the magnitude is within the range, and logic 0 if not within the range. (This step will be referred to as the first decision step.) Some window regions are then combined into a group and the combined results of the first decision step regarding each window region in a group is compared with a preset table of first decision data (the combined results of the first decision step for each region constituting each group where good patterns exist, having been entered into a table beforehand) in order to distinguish bad patterns from good patterns (this step will be referred to as the second decision step). This second decision step is carried out for all the groups and then it is comprehensively determined whether a pattern is good or bad based on the above results.

For any groups which have been found bad, a correlative decision step is made in the next stage, if necessary. The correlative decision step will be described as follows.

When an examined pattern, even if it is a good one, is slipped out of the preset position within the camera's field of vision, the magnitude of the characteristic extracted from the predetermined window region may not fall within the range of preset threshold levels. Consequently, the first decision step would result in a bad pattern being detected. However, because the pattern has been moved slightly sideward, if the correlation between the magnitude of the characteristic detected through the predetermined window region and an adjacent window region is obtained, (in this case, the correlation is represented by additions, subtractions and the like) the correlated magnitude obtained is contained within the range of preset threshold levels and the result of the first decision should instead be found good. In view of this, a combination of related proper window regions is chosen, the magnitude of each characteristic is operationally processed (for instance, added) between the regions, and the first decision is made on the processed results (this is called a first correlative decision).

A collection of the results of the first correlative decision is compared with a preset table of the first correlative decisions (which should be obtained beforehand in the same manner as the first decision table) to make a second correlative decision, whereupon it is determined whether the pattern is good or bad.

To extract the magnitude of a characteristic, it is generally needed to convert an image signal obtained by an apparatus such as a TV camera into a binary coded value, and the magnitude of the characteristic is extracted from the binary coded data.

In the above-mentioned multi-window type apparatus, although it is supplied with a number of windows (for example, 32-64 windows), using only one binary conversion circuit system with a fixed threshold level for converting all image pickup signals into corresponding binary values may not result in obtaining accurate binary data, because the level of an image pickup signal from the TV camera varies with the portion of the object if either a shade of color in the examined pattern changes depending on the portion of the object, or the density of the examined pattern varies with the portion of the object. In such a case, making a decision on the pattern being examined using improper binary data may result in erroneous decisions of the patterns being examined.

The present invention is also directed to a novel means for storing data representing window regions. In this context, a conventional arrangement for storing window region data will first be discussed.

FIG. 1 illustrates window regions M1, M2 on a picture plane P represented by rectangular coordinates X, Y on a two-dimensional basis. When the whole picture plane is raster scanned by scanning the plane P horizontally in the X direction and vertically in the Y direction, the window region generator generates outputs by scanning only in the window regions M1, M2.

FIG. 2 is a diagram illustrating the relationship between the coordinates of a window region. In other words, if the window region of M1 is divided by ordinates along horizontal scanning lines in the X direction and the coordinates of the first and last abscissa (X) points of the window region are stored, this window region may be represented in storage.

In FIG. 2, for instance, $X_{RY1,1}$ and $X_{FY1,1}$ represent the first and last points of the window region M1 on the scanning line in the X direction along the ordinate Y1. In the subscript RY1,1, the letter R signifies a leading point (starting point), Y1 signifies the abscissa location of this leading point, and 1 signifies that this leading point is the first leading point on the horizontal scanning line involved. In the subscript FY1,1, the letter F signifies a trailing point (end point), Y1 signifies the abscissa location of this trailing point, and 1 signifies that this trailing point is the first trailing point along this horizontal scanning line.

Thus the first point of the window region M1 on the horizontal scanning line along the ordinate a is represented by $X_{Ra1}$, while the last point of the window region is represented by $X_{Fa1}$. On the horizontal scanning line along the ordinate b, second leading and second trailing points $X_{Rb2}$, $X_{Fb2}$ occur after first leading and trailing points $X_{Rb1}$, $X_{Fb1}$.

When the ordinate is a and the abscissa is $X_{Ra1}$, the window output signal value then becomes "1" to open a window and remains at "1" until the abscissa reaches $X_{Fa1}$ whereupon the window is closed. As mentioned above, for the ordinate b, the first leading point of the window is located at $X_{Rb1}$ and the first trailing point at $X_{Fb1}$. When the ordinate is b, the window M2 is opened at the second leading point $X_{Rb2}$ and closed at the second trailing point $X_{Fb2}$.

FIG. 3 is a diagram illustrating the arrangement of a window region storage memory adopted in a conventional window output generator, and shows an arrangement of data in a memory for the window region shown in FIG. 2. In the arrangement shown in FIG. 3, the leftmost column indicates the abscissa which starts with 1 and ends with 256 (assuming that 256 horizontal scanning lines constitute one picture plane). On the basis of assigning one ordinate value for each scanning line, each abscissa of the first leading and trailing points and the second leading and trailing points is obtained and stored as shown in FIG. 3. When a leading or trailing point does not exist, either a mark * is stored to indicate their non-existence or the column is left blank.

Assuming that a one byte (8 bit) capacity is required to store the abscissa of one leading or trailing point, 256 bytes would be needed to store all the abscissa of the first points for each scanning line, and an additional 256 bytes to store all the abscissas of the last points for each scanning line, so that a total of at least 512 bytes would be required even for only one window per scanning line. Moreover, if second leading and trailing points exist (i.e. more than one window along a scanning line), the storage capacity will need to be twice as much. If the unused addresses (marked with *) are compressed and eliminated, one may not have the flexibility to be able to change the location or number of window regions to be generated. Therefore, according to this prior art scheme unused addresses may be required if alteration of the number and/or location of the window region is contemplated. If one attempts to generate a window region in which a maximum of m leading (or trailing) points exist on the same abscissa a storage capacity of (512×m) bytes will be required, m being normally about 8 and about 16 at maximum.

As mentioned above, because the storage capacity of the memories used in a conventional window output generator is determined by the maximum number of the first (or last) points in a window region located on the same ordinate, the requisite storage capacity becomes enormous and the number of peripheral read and write circuits also increases commensurately, resulting in high production costs. Another disadvantage is that the use efficiency of memories is low because many addresses will not be used. Still another disadvantage lies in the fact that as the number of window regions on the same ordinate increases, the above generator lacks versatility from the standpoint of the hardware arrangement, because the storage capacity must be increased by 512 bytes whenever the number of window regions increases even by one.

SUMMARY OF THE INVENTION

The present invention has been made to improve the prior art and one of its objects is to provide a multi-window type pattern discriminator which will increase the reliability of the result of a decision even if there exists a variable shade of color in a pattern being examined or if the pattern density is subjected to change.

In one arrangement of a pattern discriminator according to the present invention, binary data are obtained by using different suitable threshold levels for converting an image signal into a binary value for different portions of a pattern being examined.

An analysis of all the factors which cause the level of an image signal picked up by a TV camera to fluctuate has revealed that they are classified into two groups. One group of factors is attributable to the way the apparatus is arranged and the other group of factors is attributable to the pattern characters. Examples of the former include brightness fluctuation and camera shading. However, properly designed illumination may practically solve these problems.

On the other hand, the group of factors attributable to the character of a pattern cannot be easily eliminated, and consequently the fluctuation of an image signal picked up by a camera becomes unavoidable. However, the fluctuation in the level of the picked up signal originated in the character of a pattern will be made clear automatically if the pattern being examined is determined. In the examination and classification of patterns, since those being examined are either the same or at least similar by nature, if an object being examined is determined, one can determine the level at which the signal from the TV camera should be, depending on the portion of the object being examined (i.e., the location within the vision of the camera).

The present invention is based on the above-mentioned concept in order to obtain the most suitable binary data for each window, by providing a binary conversion circuit system with a plurality of channels (for instance, five channels) each having different threshold levels, and by selecting the proper channel of the binary conversion circuit system for each of the windows set up on a picture in a multi-window type pattern discriminator. Preferably, because a number of windows are arranged on a two-dimensional plane in the multi-window method, the selection of the above binary conversion circuit is carried out on a two-dimensional basis.

Moreover, in the multi-window method, the location and region of a window are set up on a picture plane in such a way that the basic character and characteristics of a pattern are readily extracted. Accordingly, the most suitable binary signal can be extracted on a window-by-window basis to obtain accurate data which may be given to processors in later stages, despite the fact that the level of the signal from the TV camera fluctuates depending on the portion and character of a pattern. Moreover, the signal from the TV camera is allowed to pass through different binary conversion channels for different pattern portions even in the same window, so that the signal converted into a binary value with a different threshold level may be used even within a single window.

According to another form of the invention, a pattern discriminator is provided for improving the use efficiency of memories to require less storage capacity. According to this form of the invention, the means for setting up window regions comprises a first memory and a second memory for storing abscissa data representing respective first and last points of at least one window region while dividing and sequentially compressing the abscissa data on a scanning line in the X direction in the picture plane, means for generating data representing the abscissa position of the scan along each ordinate scanning line, means for comparing the first abscissa data of the first points in a window region on a scanning line in the X direction sequentially read out of the first memory with the abscissa position data generated by the abscissa data generating means, and for generating a window output signal starting when both abscissa data conform to each other, and means for comparing the abscissa data of the last points in the window region on a scanning line in the X direction sequentially read out of the second memory with the abscissa position data generated by the abscissa data generating means, and for interrupting the window output signal starting when both abscissa data conform with each other.

BRIEF DESCRIPTION OF THE DRAWING

FIG. 1 is a chart illustrating window regions on a picture plane;

FIG. 2 is a chart illustrating the relationship between the coordinates of two window regions;

FIG. 3 is a table showing the arrangement of memories for storing window regions in a conventional window region generator;

FIG. 5 is a table showing the arrangement of memories adopted in the window region generator according to the present invention;

FIG. 6 is a diagram illustrating window regions generated by the arrangement of the memories of FIG. 5;

FIG. 7 is a block diagram illustrating an example of a window region generator according to the present invention;

FIG. 8 is a time chart for illustrating operation of the circuit of FIG. 7;

DETAILED DESCRIPTION OF THE PREFERRED EMBODIMENT

Figure 4:
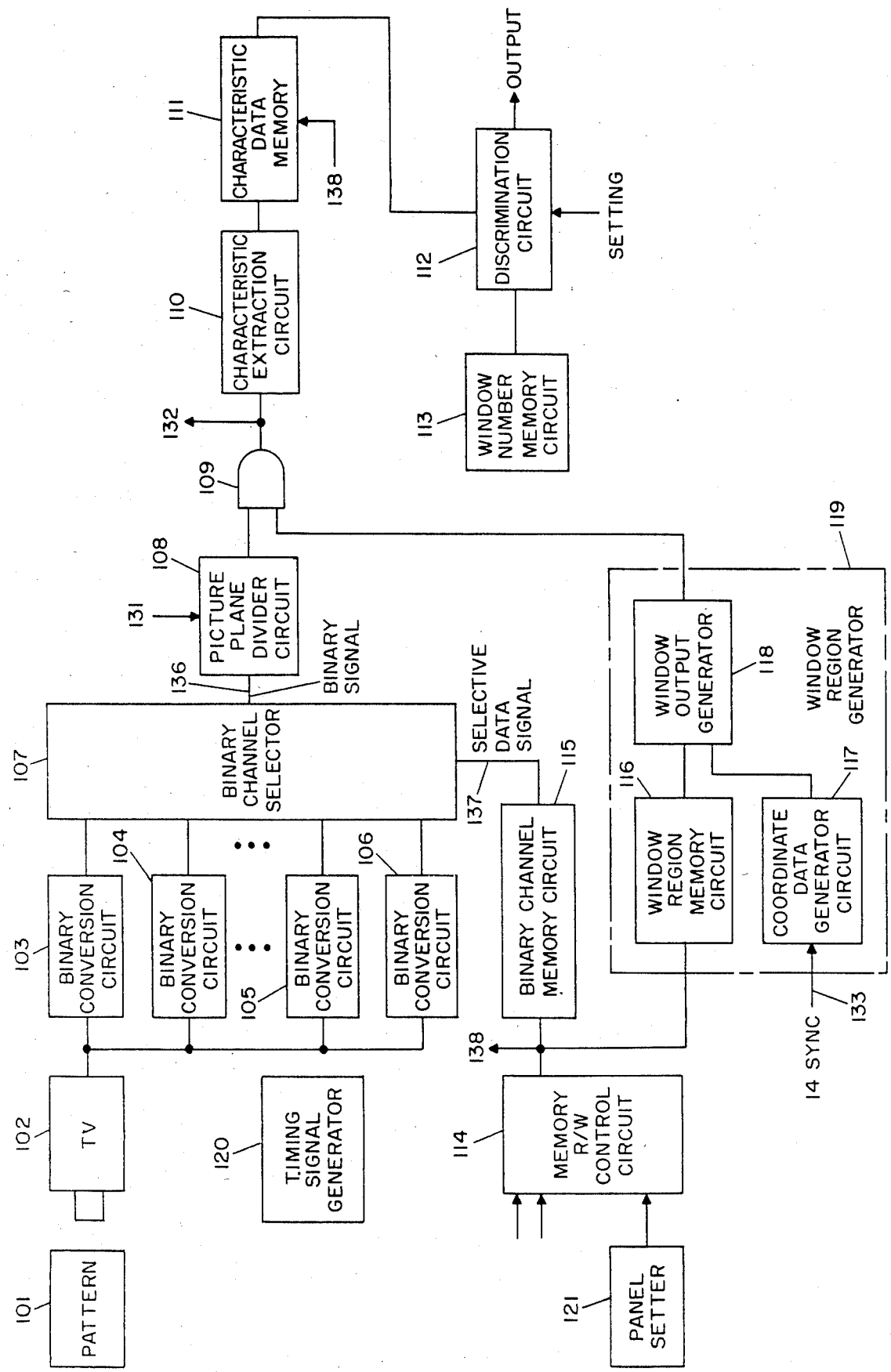
FIG. 4 is a block diagram illustrating an example of a pattern discriminator according to the present invention.

Referring now to FIG. 4, a detailed description of a pattern discriminator according to one form of the present invention will be given.

FIG. 4 shows a pattern 101 being examined, a TV camera 102, binary conversion circuits 103-106 each having different threshold levels, a binary signal (channel) selection circuit 107, a picture plane divider circuit 108, an AND gate 109, a characteristic extraction circuit 110, a characteristic data memory circuit 111, a discrimination circuit 112, a window number memory circuit 113, a memory R/W (read/write) control circuit 114, a binary channel memory circuit 115, a window region memory circuit 116, a coordinate data generator circuit 117, a window output signal generator 118, a winoow region generator 119, a timing signal generator circuit 120 for generating timing signals to be sent to each circuit, and a panel setter 121 for inputting data into memory.

During the operation of this pattern discriminator, the pattern 101 is brought in by a feeder (not shown) and placed within the field of vision of the TV camera 102. The TV camera 102 converts image data on the pattern being examined into electrical signals in a raster scan manner. The electrical signals are amplified, and are then converted into binary or digital signals by the binary conversion circuits 103-106, which each have different threshold levels.

The threshold level in each binary conversion circuit may be determined by a fixed threshold method, a floating threshold method, or a differentiation method. One of the outputs of the binary conversion circuits 103-106 is selected in the binary signal selection circuit 107 to become the binary signal 136. The binary signal selection circuit 107 is, as described below, controlled by a selective data signal 137 to select a signal from the specified channel (binary conversion circuit) 107. In this manner, different threshold values can be used for converting the analog electrical signals into digital data for different locations within the region scanned.

The binary signal 136 thus selected is divided into a number of picture elements or pixels (for instance, 320 pixels × 244 pixels in length and breadth) by the picture plane divider circuit 108. The picture element signal is introduced into the characteristic extraction circuit 110 through the AND gate 109 only when the AND gate is opened by a window output signal from the window region generator 119.

The characteristic extraction circuit 110 used to extract the predetermined characteristics of a pattern is a known circuit comprising a two-dimensional local memory, a two-dimensional local logical operation circuit, a counter and other components. A detailed description of this circuit is omitted herein because it is not directly related to the present invention. The inputs to the characteristic extraction circuit 110 are limited to what belongs in the window region, and the data on the magnitudes of the characteristics of the pattern within the window region are extracted and counted. Subsequently, the extracted data are stored in the characteristic data memory 111.

When the scanning of the picture plane has been completed by the TV camera 102, the discrimination circuit 112 refers to the window number memory 113 and totals the characteristic data on a window-by-window number basis. The circuit also compares the characteristic data with threshold levels to determine whether the pattern being examined is good or bad.

Normally a plurality of windows are provided on the picture plane scanned by the TV camera 102. In accordance with the invention, a window number is assigned to each separate window, and the window numbers are stored in the memory 113. As mentioned above, provision is made for using different threshold levels to convert electrical analog signals into binary digital values for each window. The threshold level for a particular window is selected in the selection circuit 107 and inputted to the characteristic data circuit 111 through the picture plane divider circuit 109, AND gate 108 and characteristic extraction circuit 110.

A detailed description of the means for generating a window output signal according to the invention will be given with reference to FIG. 5 and FIG. 6. FIG. 5 shows a descriptive table of memory arrangements adopted in the window region generator according to the present invention. In FIG. 6, window regions (1), (2) ... (m) exist on a horizontal scanning line in the X direction on the ordinate Y1. The abscissas of leading points in regions (1), (2) ... (m) along the scanning line Y1 are each represented by $X_{RY1,1}$, $X_{RY1,2}$, ... $X_{RY1,m}$, whereas the trailing points in regions (1), (2) ... (m) along this scanning line Y1 are indicated by $X_{FY1,1}$, $X_{FY1,2}$, and $X_{FY1,m}$, respectively. In like manner, the abscissas of leading points in window regions (1), (2), (3) ... (l) existing on a horizontal scanning line Y2 in the X direction are shown by $X_{RY2,1}$, $X_{RY2,2}$, $X_{RY2,3}$ ...

$X_{RY2,l}$, while the trailing points are indicated by $X_{FY2,1}$, $X_{FY2,2}$, $X_{FY2,3}$ ... $X_{FY2,l}$.

As shown in FIG. 5, the abscissas are divided into two groups, one group for leading and one group for trailing points, and the abscissa data are stored in sequential order and compressed. A data byte FF in hexadecimal code (representing the position of the last pixel on the line) is stored as an abscissa value at the end of each horizontal scanning line. Consequently, the abscissa of the leading points and of the trailing points are respectively stored in the left and right columns in the arrangement shown in FIG. 5. Thus, the generation of blank columns (addresses marked with * and not to be used) is avoided as compared to the case of the conventional arrangement shown in FIG. 3. With the abscissa data stored and arranged in the memories as shown in FIG. 5, the use efficiency of the memories is improved, and the requisite storage capacity can be minimized.

An example of a window region generator for generating window output signals using a memory arrangement like that of FIG. 5 will now be described with reference to FIG. 7, which is a block diagram of a window region generator according to the present invention. In FIG. 7, a RAM (random access memory) 1 for storing the coordinates of leading points employs a memory storage arrangement like that shown in the left column in FIG. 5, while another RAM 2 used for storing the coordinates of trailing points employs a memory storage arrangement like that shown in the right column in FIG. 5. FIG. 7 also shows latch circuits 3, 4, comparators 5, 6, an abscissa position generator 7, a FF data detector 8, an AND gate 9, and a front/rear pulse generator circuit 10.

FIG. 8 is a time chart used to explain the operation of the circuit in FIG. 7. When a horizontal synchronizing signal $H_{SYNC}$ in horizontal scanning is applied to the front/rear pulse generator circuit 10 from a horizontal synchronizing signal generation circuit (not shown), the generator circuit 10 generates a front pulse F on the front edge F of the signal $H_{SYNC}$ and sends this pulse to the RAM 1 and RAM 2, in order to read out the data representing the leading point abscissa $X_{RY1,1}$ stored in RAM 1 for the window region (1), and the trailing point abscissa $X_{FY1,1}$ stored in RAM 2 for the window region (1). The data representing the leading point abscissa $X_{RY1,1}$ and the trailing point abscissa $X_{FY1,1}$ are latched in the latch circuits 3, 4, respectively, by sending the rear pulse R to the latch circuit 3 and 4 with the rear edge of the horizontal synchronizing signal $H_{SYNC}$. Comparator 5 sequentially compares the abscissa of leading point $X_{RY1,1}$ with the actual abscissa given by the abscissa generator 7 and a high level output signal is generated starting when the two abscissas conform to each other. This high level output signal passes through the AND gate 9 to the front/rear pulse generator circuit 10, allowing the circuit to output a window output signal thereafter.

Comparator 6 sequentially compares the coordinate of trailing point $X_{FY1,1}$ with the actual abscissa given by the abscissa coordinate generator 7 and the high level output signal that has been generated is then changed into a low level output signal after both abscissas conform to each other. Due to this, the window output signal that has been generated from the pulse generator circuit 10 is interrupted, and a window output signal indicating the window region (1) in FIG. 7 will be seen.

At the time when the comparator 5 compares the input coordinates $X_{RY1,1}$ from the latch 3 with the actual abscissa position from the abscissa generator 7, and sends a high level signal, indicating that both abscissas conform to each other, to the pulse generator circuit 10 through the AND gate 9 to generate a window output pulse, the pulse generator circuit 10 again transmits a front pulse F and reads the next abscissas $X_{RY1,2}$ of the next leading point and $X_{FY1,2}$ of the next trailing point out of RAM 1 and RAM 2, respectively. When the output of the comparator 6 is changed from a high logic level signal to a low level signal as mentioned above, the comparator 5 sends a rear pulse R to the latch circuits 3, 4 from the pulse generator circuit 10 in order to latch the abscissas $X_{RY1,2}$ and $X_{RY1,2}$ of the second leading and trailing points.

Thereafter, the pulse generator circuit 10 sends the window output signals corresponding to the window regions (2), ... (m) in FIG. 8 in the same manner. Lastly, data FF indicating the end of the one horizontal scanning line are read out of RAM 1 or RAM 2 and given to the latch circuit 3 or 4. When the FF data are detected by the FF detector 8, the detector output changes from its high level into a low level, causing the AND gate 9 to close.

Subsequently, when the second horizontal synchronizing signal $H_{SYNC}$ is applied to the pulse generator circuit 10, the abscissas of leading and trailing points on the next horizontal scanning line are read out and latched, so that a window output is again generated. The above processes are repeated in like manner.

A driving signal EN for starting the operation of abscissa coordinate generator 7 is preferably applied to the generator 7 when the horizontal scanning reaches ordinate Ys in FIG. 1 for example, to the first window region M1. For this purpose, a subtraction counter (not shown) can be used which starts with a preset value Ys, and arranged so that subtraction is carried out at the end of each horizontal scanning, and so that the counter outputs a signal when it reaches zero and thereby enables the abscissa position generator.

Figure 9:
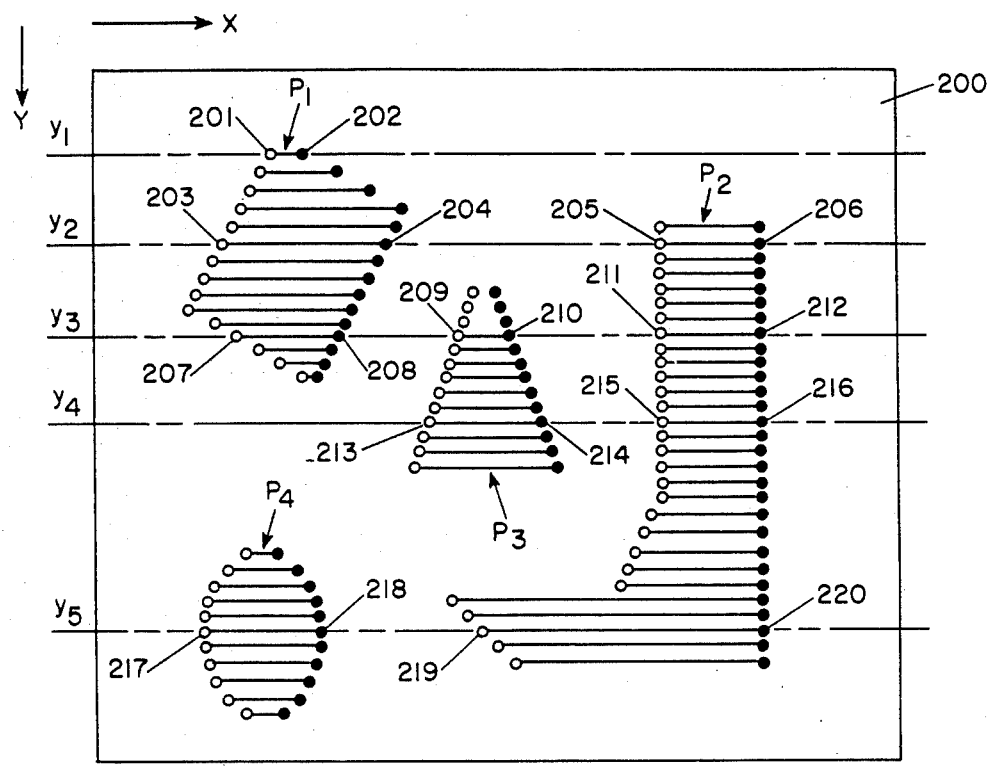
FIG. 9 is a diagram of scanning segments in the window regions.

Referring again to FIG. 4, the relationship between the means for setting up window regions and the binary conversion circuit will now be described. As shown in FIG. 9, a picture plane 200 is supplied with four window regions P1–P4 and is raster scanned horizontally and vertically in a conventional manner. Point 201 (marked with °) on the horizontal scanning line $Y_1$ is the first point of the window region P1, whereas 202 (marked with *) is the last point on that line. Similarly, point 203 on the line $Y_2$ is the first point of the window region on that line and 204 is the last point on that line. Further, point 205 is the first point of another window region P2, and point 206 is the last point on that line. Thus the first and last points of the window regions on all the ordinate (Y-lines) are determined and data representative of the abscissa positions of the first and last points are stored in such a manner that a window output signal is generated when raster scanning starts and arrives at the first points of a window region, and are interrupted when the scanning is brought to the last point of a window region. Therefore, a window output signal can be obtained which represents the window regions that have been previously set up.

As described above, the window region generator 119 of FIG. 4 is composed mainly of the window region memory circuit 116, the coordinate data generator circuit 117, and the window output signal generator 118. The abscissa data generator circuit 117 obtains the ordinate on the picture plane by counting the horizontal synchronizing signals $H_{SYNC}$ 133 generated by the TV camera 102 on a horizontal scanning basis and obtains abscissa scanning position data on the picture plane by counting, for instance, clock pulses at 6 MHz given by dividing, into n, the time period of scanning for one line. The window output signal generator 118 generates a window output signal representing the two-dimension window regions by comparing data stored in the window region memory circuit 116 with abscissa data from the abscissa position generator circuit 117.

Figure 10:
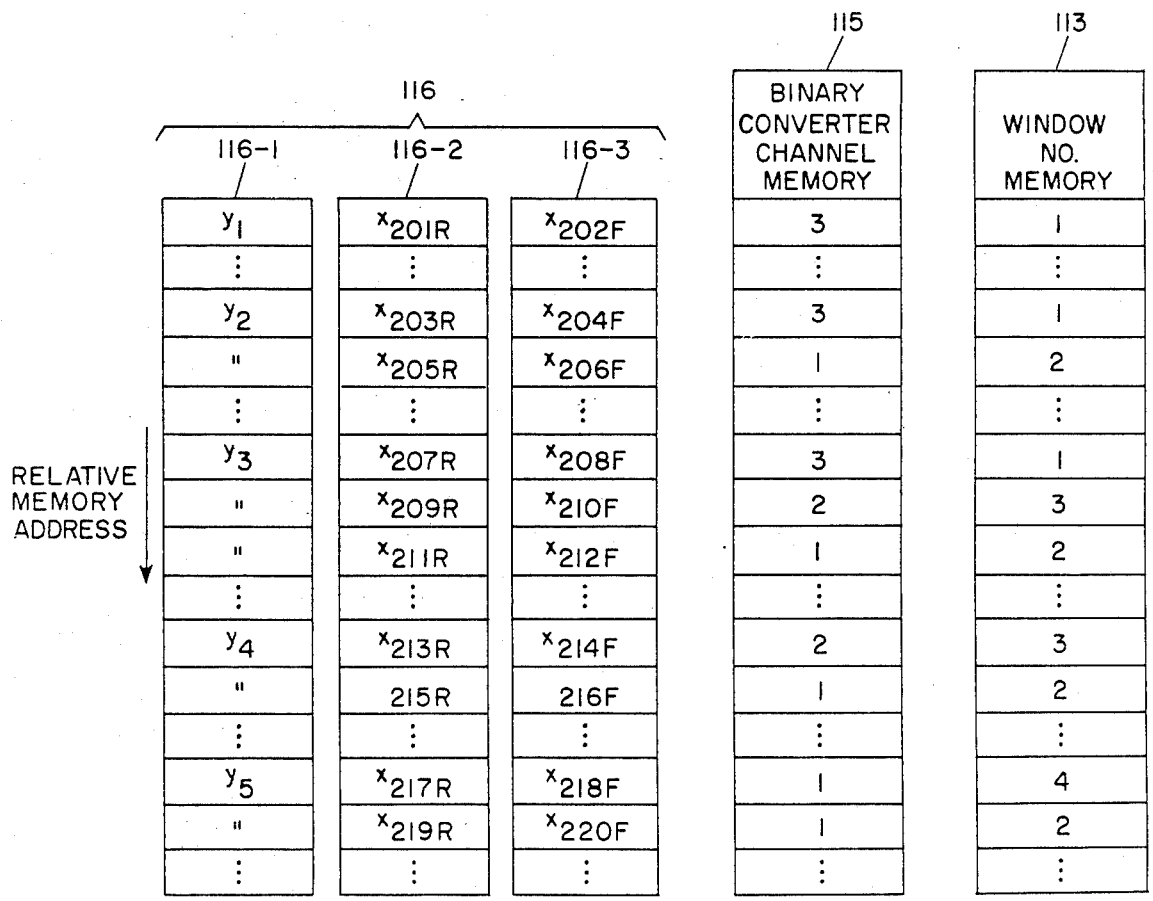
FIG. 10 is a table of the arrangement of memories in the circuit of FIG. 4.

FIG. 10 is a chart illustrating the arrangement of window region memory 116, binary conversion channel memory 115 and window number memory 113 as shown in FIG. 4, using the same reference numbers. In FIG. 10, the window region memory 116 consists of an ordinate data memory (116-1), an abscissa data memory (116-2) for storing data representing the leading points of window regions, and an abscissa data memory (116-3) for storing data representing the trailing points of window regions. The relative addresses of these three memories are preferably identical, and by using the three data bytes read out with the identical address, data on the location of the window region segment for that scanning line can be obtained. In particular, the data in the abscissa memories (116-2), (116-3) are arranged so that the order that the segment data is sequentially read out conforms to the scanning order obtained using a raster scan.

FIG. 10 shows abscissa data on window region scanning segments for the ordinates $Y_1-Y_5$ of FIG. 9. For instance, $X_{201R}$ signifies that it is the abscissa of the first point 201 in the window region P1 shown in FIG. 9, where the letter R signifies a leading or first point, whereas $X_{202F}$ represents the abscissa of the last point 202 in the window region P1, where the letter F signifies a trailing or last point.

In the position of the ordinate Y2, the abscissas indicating the first and last points of the window region are stored in the memory in the order of windows P1, P2 but, on the abscissa Y3, in the order of windows P1, P3, P2 (the window numbers of the windows P1, P2, P3, P4 are assumed to be 1, 2, 3, 4 in window number memory 113). Consequently, if data are sequentially read out of the memory 116, window regions P1-P4 may be generated on the TV screen as shown in FIG. 9. The reading of data out of the window region memory circuit 116 is carried out by means of the write/read control circuit 114.

The following description will be addressed to the relationship between the number of window regions set up on the screen and the selection of a binary conversion circuit so that different threshold levels can be used in different window regions to convert the electrical analog image signals into binary or digital values.

As shown in FIG. 10, the binary conversion channel memory 115 an.d the window number memory 113 have a similar arrangement of addresses as the window region memory 116. The window number data are stored in the memory 113 in correspondence with the particular coordinate data stored in the memories (116-1, 116-2, 116-3). In addition, the channel selection data in the binary conversion circuits 103-106 are stored in the binary channel memory 115 in correspondence with the addresses of the coordinate data.

Accordingly, it is possible to select a certain binary conversion circuit having one threshold level for one window region and a different binary conversion circuit having a different threshold level for another window region. As shown in FIG. 10, the channel data representing the particular binary conversion circuit can be made different for each window number. In FIG. 10, the window number 1 corresponds to the binary conversion channel data 3, the window number 2 corresponds to the binary conversion channel data 1, and the window number 3 corresponds to the binary conversion channel data 2.

Data are sequentially read out of the binary conversion channel memory 115 by synchronizing the data with the TV raster scanning with the same timing as that for reading data out of the window region memory 116 and are latched in the latch circuit (not shown). The data in the latch circuit, when given to the binary signal selection circuit 107, allow the output of the selection circuit 107 to transmit a signal of the selected binary conversion channel to the characteristic extraction circuit 110. Therefore, if the data in the binary conversion channel memory 115 are selected and stored as required, it will be possible to obtain a binary value signal 136 by using an individual threshold level on a window region or subregion basis.

The characteristic feature, as shown in FIG. 10, is that binary conversion channel data corresponding to the scanning segment of each window.have been separately stored. Consequently, different binary conversion channel data may be stored for different window portions even within the same window, and the outputs of different binary conversion channels may be selectively extracted within the same window. It is therefore possible, during processing of an image, to locally change the binary conversion level within the same window (and this occurs often), and measurements can thus be readily taken with accuracy.

Data can be read and controlled on a realtime basis out of the window region memory 116 and the binary conversion channel memory 115 in synchronization with TV scanning. As a result, for each scanning segment in each window, one optimum binary signal 136 is extracted as shown in FIG. 4, so that the data memory in the characteristic extraction circuit 110 can be the same as in the case of one binary conversion circuit, without the necessity of increasing the storage capacity.

Figure 11:
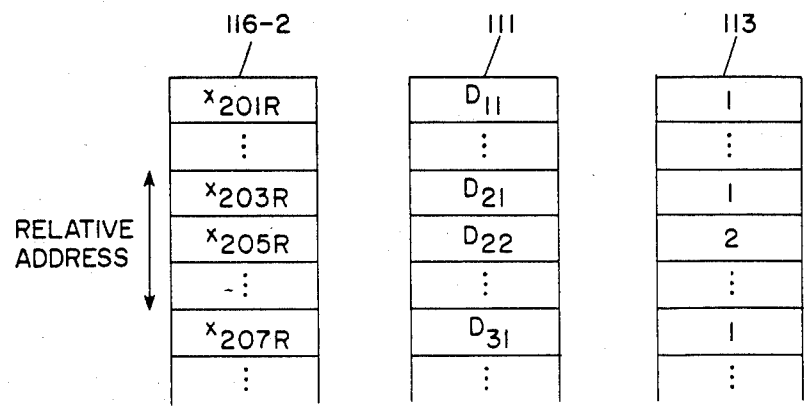
FIG. 11 is a chart illustrating the relationship between a window memory region and a characteristic data memory circuit and a window number memory circuit.

Although the output of the characteristic extraction circuit 110 is stored in the characteristic data memory 111, as shown in FIG. 11, characteristic data $D_{ij}$ corresponding to a particular segment (116-2) of the window are stored in the memory 111. Accordingly, the characteristic data memory 111 refers to the memory 113 for the window number corresponding to that particular window region or subregion thereof and accumulates the characteristic data that belong to the same window number. This process, when carried out for all the windows, allows characteristic data to be obtained on all the windows. Thereafter, the discrimination circuit 112 compares the characteristic data with preset values, gives decisions, and classifies the results.

While the example shows a plurality of binary conversion circuits provided with means for switching between them, one comparator may be used to convert data into a binary value by providing a plurality of threshold level data for comparison and by switching them from one level to another.

The panel setting circuit 121 is designed to allow the operator to input necessary data to the control circuit 114 and to load the required data into each memory.

According to the present invention, the following are among the advantages achieved.

Since any binary conversion circuit may be selected depending on the particular window or portion thereof, optimum binary image data is available in spite of any fluctuation due to camera pattern and of the pattern itself.

Different binary level signals of the binary conversion circuit may be used even within the same window, so that accurate image processing can be carried out.

The memory can be arranged so that a number of windows can be set up and to have window regions switched and binary conversion channels controlled synchronously with TV raster scanning. Consequently, if a plurality of binary conversion circuits are employed, a conventional set of processors can be used to process images in later stages. Also, the time required for processing is substantially equal to the time required using one threshold level and one binary conversion channel.

Since one need store data only along the scanning lines where the window regions appear, data for all scanning lines are not always needed. In other words, it is unnecessary to provide a memory capacity for storing 256 bytes corresponding to the total number of scanning lines.

Since the coordinates of the leading and trailing points on the same scanning line are stored in memory regions in a compressed manner, even if the number of window regions on one scanning line is changed, the memory storage capacity required will not increase significantly; and as compared to the prior art, the number of bytes will not likely increase by 256 in order to add just one window region.

By using a data code 'FF' to indicate the end of a scanning line, the coordinates of the first and last points can be stored by compressing them on a scanning line basis and thereby utilize memory storage more effectively.

Since the coordinates of the leading and trailing points in the next window region are read out of memory with a front window edge signal, or with the front window edge of the immediately previous window region or horizontal synchronizing signal, the circuitry for generating windows is simple and less likely to malfunction.

The present invention is applicable to pattern inspection, pattern discrimination, intelligent robots, OCR's and so on in many fields of technology.

From the foregoing, it will be observed that numerous variations and modifications may be effected without departing form the true spirit and scope of the novel spirit of the invention. It is to be understood that no limitation with respect to the specific apparatus illustrated here is intended or should be inferred. It is, of course, intended to cover by the appended claims all such modifications as fall within the scope of the claims.

We claim:

1. In a pattern discriminator which receives scanning data obtained by scanning objects within defined window regions with a photoelectric converter of the two-dimensional scanning type, and having means for converting the scanning data into pixel binary data representing characteristics of the object scanned by using a threshold value whih is variable within a window region, and having means for evaluating the binary data in accordance with predetermined criteria and for producing an output signal indicative of said evalution, the improvements comprising:

means for defining a plurality of window regions, comprising memory means for storing abscissa data representing the beginning and ending absceissa points of each window region on each scanning line in a compressed arrangement so that the memory need only store data for scanning lines having window regions located thereon, means for generating postional data representing the abscissa scanning position along each scanning line, comaprator circuit means comprising two comparators, one comparator for comparing the abscissa scanning position data with the beginning abscissa point data and for producing an output when the abscissa position is after the beginning abscissa point, and a second comparator for comparing the abscissa scanning position data with the ending abscissa point data and for producing an output when the abscissa position is before the ending point, and logic gate means generating a window output signal in response to the production of outputs from the two comparators;

means for gating the binary data to said evaluation means in response to said window output signal, so that only binary data for points within a window region are provided to the evaluation means, and the evaluation means comprising a plurality of binary conversion channels each having a different threshold level, and means for selecting from said plurality of binary conversion channels the output of a particular one for evaluating the second data supplied thereto based on the parameter stored in said memory corresponding to the address of the data being processed.

* * * * *